Inventors,
Michael J. Bolton,
George A. Joyner, Jr.,
Richard H. Lux,
by *Gilbert P. Tarleton*
Their Attorney.

United States Patent Office 3,177,107
Patented Apr. 6, 1965

3,177,107
METHODS OF MAKING INSULATION, AND PRODUCTS FORMED THEREBY
Michael J. Bolton, George A. Joyner, Jr., and Richard H. Lux, all of Rome, Ga., assignors to General Electric Company, a corporation of New York
Filed Dec. 28, 1961, Ser. No. 162,838
5 Claims. (Cl. 156—319)

This invention relates to electrical insulation, and more in particular to an improved process for making electrical insulation from asbestos sheet material impregnated with aluminum phosphate binder.

In United States Letters Patent 2,702,068 and 2,804,908, both assigned to the same assignee as this invention, there are described aluminum-phosphate-bonded asbestos insulating materials which provide hard, dense laminated products adapted for high temperature electrical insulating applications. We have found that by compressing aluminum-phosphate-impregnated asbestos at a particular stage in the processes for making the materials described in the above-indicated patents, the dielectric strength of such materials is greatly increased, while other desirable characteristics, such as high temperature resistance, good mechanical properties, and low power factor, are not impaired. Although compressing unimpregnated asbestos sheet material is a well known way of improving its mechanical handling properties, such as flexibility, we have discovered that reducing the thickness of the impregnated material within a critical range results in an unexpected increase in dielectric strength.

Accordingly it is an object of this invention to provide methods for making aluminum-phosphate-bonded asbestos products having increased dielectric strength.

Another object is to provide economical, hard, dense asbestos products impregnated with aluminum phosphate and having increased dielectric strength.

Another object is to provide improved methods for increasing the dielectric strength of aluminum-phosphate-impregnated asbestos materials by compressing the material.

Another object is to provide methods for increasing the dielectric strength of aluminum-phosphate-impregnated asbestos sheet materials by calendering the impregnated sheet material.

A further object is to provide improved methods for increasing the dielectric strength of laminates made from aluminum-phosphate-bonded asbestos by reducing the thickness of the asbestos before superimposed layers are formed into a laminate.

Other objects and advantages of the invention will become apparent from the specification, drawing, and claims, and the scope of the invention will be pointed out in the claims.

Briefly stated, according to one aspect of our invention, hard, dense electrical insulating asbestos products having high dielectric strength may be made by processes in which fibrous asbestos material is impregnated with aluminum phosphate. The impregnated material is then dried to substantially remove tackiness. After being dried, the impregnated material is compressed until its thickness is reduced about 25 to 45%, or until its density remains substantially constant on further compression. This significantly increases its dielectric strength, and the thus treated material is suitable for use by itself as electrical insulating material or as a laminated product made as described in the previously-mentioned patents.

Figure 1:
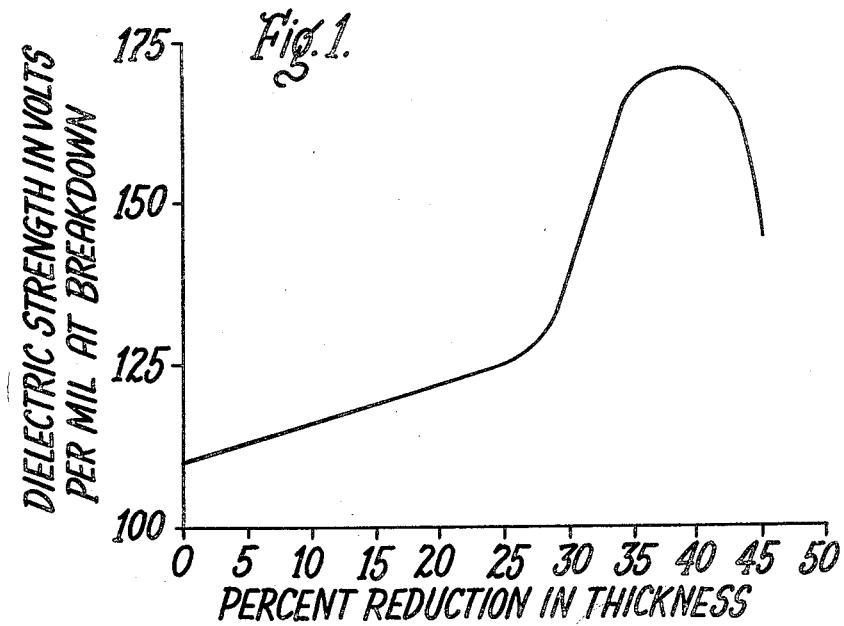
FIGURE 1 is a graph showing the effect of compressively reducing the thickness of aluminum-phosphate-impregnated asbestos sheet material on the dielectric strength of the material.

The general methods of making aluminum-phosphate-bonded asbestos insulating materials that our invention provides improvements in are disclosed in United States Patents 2,702,068 and 2,804,908. Generally speaking, the methods involve impregnating fibrous asbestos sheet material with a solution of mono-aluminum phosphate. Then the impregnated material is air dried, generally at an elevated temperature until substantially all of the tackiness is removed and the impregnated material attains sufficient strength for further handling. Our invention is based on the discovery that by compressing the material at this stage in its processing, the dielectric strength of the impregnated material is increased substantially. After the material has been compressed, it may then be formed into laminates by superimposing a plurality of layers of material and compressing them at elevated temperatures. Or, the compressed material may then be coated with a higher aluminum phosphate having the formula $Al_x(H_{3-x}PO_4)_3$ wherein $x$ has the value of from about 1.3 to 1.7. The thus coated material may then be securely bonded into a laminate as for example by winding on a mandrel and heating up to about 260° C. for varying time cycles. The laminated material may be coated with a suitable varnish, and it may be fired at an elevated temperature, as described in Patent 2,804,908.

The aluminum phosphates employed in the practice of this invention are water soluble or water dispersible products which, by removal of all or part of the water, are converted into insoluble solid products having excellent bonding and insulating characteristics. The expression "aluminum phosphates" as used in the specification and claims is intended to mean commercially pure aluminum phosphate or mixtures of aluminum phosphate and minor amounts of other water soluble inorganic phosphates.

The term mono-aluminum phosphate is intended to mean aluminum phosphate of the formula $Al(H_2PO_4)_3$ as well as the aluminum phosphates in which the aluminum to phosphate ratio varies slightly from the 1 to 3 ratio, and may be as high as 1.2 to 3. These aluminum phosphates are water soluble materials which can be employed in the form of relatively low viscosity solutions for the complete impregnation of the fibrous asbestos, and they are characterized by the fact that after removal of the water, in whole or in part, there is obtained an impregnated asbestos material of good flexibility and high strength which can be readily employed in the manufacture of laminated or molded products.

The higher aluminum phosphates employed for bonding the mono-aluminum-phosphate-impregnated asbestos into a laminated structure are those which form a viscous aqueous solution having a viscosity which may be 100 times the viscosity of the mono-aluminum phosphate solution. These more viscous products, after removal of all or part of the water, are converted into relatively hard, somewhat brittle, resin-like solids and have been found to have excellent bonding action for the mono-aluminum phosphate impregnated asbestos.

The fibrous asbestos materials employed in the practice of our invention may be of any of the usual commercially available asbestos sheet materials consisting predominantly of asbestos fibers. Such sheet material may consist entirely of asbestos fiber or it may contain cellulose fiber, such as cotton or kraft, or minor amounts of other ingredients such as starch, frequently present in commercial asbestos paper for strengthening purposes. Also included within the scope of the present invention are asbestos mixtures containing minor quantities of bentonite, glass fibers, or plastic fibers such as nylon.

The process steps by which asbestos sheet material is first impregnated with mono-aluminum phosphate, and thereafter dried, and subsequently formed into a laminated product are all known to the prior art. Our invention resides in the discovery that by compressing the mono-aluminum-phosphate-impregnated asbestos material after it has been dried sufficiently to remove tack, the dielectric strength of the end product is greatly increased. The asbestos should be impregnated before being compressed because pre-compressed asbestos is too dense to absorb the mono-aluminum phosphate solution. The impregnated asbestos should be dried before being compressed to prevent it from sticking to the compressing device and to increase its resistance to tearing.

The preferred method of compressing a web of sheet material is by passing it through calender rolls until the desired amount of thickness reduction is attained. Depending on the force applied by the rollers, several passes of the web through the rolers may be required. Of course, other methods may be employed to reduce the material thickness, such as by compressing between the platens of a press, or by compression molding.

Experiments have shown that there is a critical range for thickness reduction that produces optimum results. Test specimens were made from sheets of commercially available asbestos paper having about 3 to 6% kraft fiber and about 13 to 15 mils in thickness. The paper was impregnated with an aqueous solution of mono-aluminum phosphate. The impregnated paper was air dried for about 2 to 3 minutes at 130° to 150° C. until substantially all tackiness was removed and the paper attained sufficient mechanical strength for further handling. The above characteristics were attained when the dried, impregnated paper had a moisture content of from 11 to 16% by weight, with optimum results being attained with moisture contents of from 12 to 14%. The dried, impregnated paper was then passed through calender rolls until its thickness had been reduced predetermined amounts. The pressure on the rolls varied from about 500 to about 3,000 pounds per lineal inch of paper width for various samples. The compressed paper was then coated with an aqueous solution of a higher aluminum phosphate of the type described previously, and then wound on a mandrel to form a laminated cylinder. The laminated cylinders were air dried on the mandrels at room temperature, and then the cylinders were removed from the mandrels and oven dried at temperatures from about 60° C. to about 260° C. for varying time cycles. During the final drying cycle, the cylinders were coated with a suitable varnish of the type described in United States Patent 2,702,068.

Specimens were cut from the above-described cylinders and tested by ASTM Short Time Dielectric Breakdown Method No. D-149 to determine dielectric strength. The test results are presented in the form of a graph in FIG. 1. The plotted values were obtained by averaging the test results for numerous specimens. Specimens tested by standard methods revealed that mechanical properties, such as flexural strength and modulus of elasticity, power factor, and temperature resistance were not impaired by compression of the material; in fact, mechanical properties were improved by compression within the below described critical range.

FIG. 1 reveals a critical range in which the thickness reduction should be maintained. This range starts at around 25% thickness reduction and extends to about 45% thickness reduction. Below 25% thickness reduction, the dielectric strength does not increase significantly. Between about 42% and 45% thickness reduction, the dielectric strength begins to fall off, and above about 45% thickness reduction, any increase is not worthwhile. The preferred thickness reduction range is from about 32 to 42% because optimum increase in dielectric strength is obtained between these limits.

Figure 2:
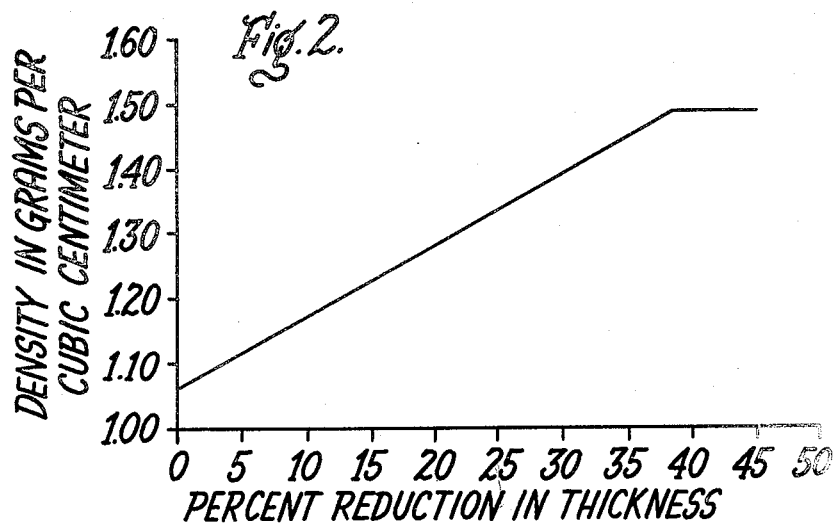
FIGURE 2 is a graph showing the effect of compresively reducing the thickness of aluminum-phosphate-impregnated asbestos sheet material on the density of the material.

FIG. 2 shows a graph in which the percent reduction in thickness of aluminum-phosphate-impregnated asbestos sheet material is plotted against the density of the compressed material. The plotted data was obtained from samples of the mono-aluminum-phosphate-impregnated, compressed asbestos paper described above, before the paper was coated with the higher aluminum phosphate. It should be noted that density levels off between about 35–40% thickness reduction, with no appreciable increase in density being obtained with further reduction of material thickness. It is believed that the reason density does not increase with further reduction of thickness is that the material forming the sheet flows laterally rather than being compressed further. Attempts to reduce thickness above about 45% usually resulted in tearing the sheet material. It is believed that the failure of the material to increase in dielectric strength above about 45% thickness reduction is caused by the fibers being crushed rather than merely being compressed. However, no explanation is known for the sharp increase in dielectric strength after about 25% thickness reduction, since in this range on the density graph of FIG. 2 density varies uniformly linearly with thickness reduction. Thus, the increase in dielectric strength between about 25 and 45% thickness reduction is both unexpected and unexplainable by present theories.

Results similar to those shown in FIGS. 1 and 2 were obtained for specimens made from commercially available asbestos paper about 8 mils thick and for specimens made from paper about 18 mils thick processed in the manner described with reference to FIG. 1. Specimens were made from papers of widths varying from 12 to 36 inches.

The electrical insulating products formed by our processes are useful for various electrical applications. They are particularly well suited for use as insulation in dry-type transformers. Without further treatment, the dried materials can be employed in sealed dry-type transformers as either cylinders on which the winding coils are wrapped or as flat plates, spacers, end rings, and various forms of voltage barriers. When employed in non-sealed dry-type transformers, aluminum-phosphate-bonded asbestos articles should preferably be given a varnishing treatment with any suitable electrical insulating varnish for the purpose of increasing water resistance. The products formed by our processes are machinable, sawable, sandable, and drillable, and the raw materials employed in their manufacture are relatively cheap, so the resulting products are relatively inexpensive.

It will be understood, of course, that while the forms of the invention herein shown and described constitute preferred embodiments of the invention, it is not intended herein to illustrate all of the equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. The method of making a hard, dense electrical insulting laminated asbestos product having high dielectric strength, comprising:
   (a) impregnating asbestos paper having a thickness in the range of about 8 to 18 mils with an aqueous solution of mono-aluminum phosphate,
   (b) drying the impregnated paper to substantially remove tackiness,
   (c) compressing the dried paper until its thickness is reduced about 30–42%, (d) coating the compressed paper with an aqueous solution of aluminum phosphate of the formula $Al_x(H_{3-x}PO_4)_3$, (d') wherein x has a value of from 1.3 to 1.7, and (e) forming a laminated product from the coated paper.

2. The method of making a hard, dense electrical insulating laminated asbestos product having high dielectric strength, comprising:

(a) impregnating asbestos sheet material having a thickness in the range of about 8 to 18 mils with aluminum phosphate, (b) drying the impregnated sheet material to substantially remove tackiness, (c) compressing the dried sheet material until its thickness is reduced about 32–42%, and (d) forming a laminated product from the compressed sheet material.

3. The method of making a hard, dense electrical insulating asbestos product having high dielectric strength, comprising:

(a) impregnating fibrous asbestos sheet material having a thickness in the range of about 8 to 18 mils with aluminum phosphate, (b) drying the impregnated material until its final moisture content is from 11 to 16% by weight, thus rendering it substantially tack-free yet mechanically strong, and (c) compressing the dried material until its thickness is reduced about 30–42%.

4. The method of making a hard, dense electrical insulating laminated asbestos product having high dielectric strength, comprising:

(a) impregnating asbestos sheet material having a thickness in the range of about 8 to 18 mils with aluminum phosphate, (b) drying the impregnated sheet material until its final moisture content is of the order of 11 to 16% by weight thereby to substantially remove tackiness, (c) compressing the dried sheet material until its thickness is reduced about 30–42% and (d) forming a laminated product from the compressed sheet material.

5. A hard, dense laminated electric insulating material formed of a plurality of sheets of asbestos fibre impregnated with aluminum phosphate and thereafter individually compressed and densified after partial drying, said sheets being in the range of about 8 to 18 mils in thickness before impregnation and being compressed individually until sheet thickness is reduced about 30–42%.

References Cited by the Examiner

UNITED STATES PATENTS

| | | | |
|---|---|---|---|
| 1,780,743 | 11/30 | Codwise | 161—268 |
| 2,463,856 | 3/49 | Dickerman | 156—281 |
| 2,601,243 | 6/52 | Botts et al. | 156—185 |
| 2,702,068 | 2/55 | Spooner | 161—205 |
| 2,804,908 | 9/57 | Spooner | 117—126 |

ALEXANDER WYMAN, *Primary Examiner.*

EARL M. BERGERT, CARL F. KRAFFT, *Examiners.*